United States Patent
Cochran et al.

(10) Patent No.: US 7,529,966 B2
(45) Date of Patent: May 5, 2009

(54) STORAGE SYSTEM WITH JOURNALING

(75) Inventors: Robert A. Cochran, Sacramento, CA (US); David E. Oseto, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 820 days.

(21) Appl. No.: 10/922,730

(22) Filed: Aug. 20, 2004

(65) Prior Publication Data

US 2006/0041789 A1    Feb. 23, 2006

(51) Int. Cl.
   *G06F 11/00* (2006.01)
(52) U.S. Cl. .............................. 714/6; 714/15; 711/161; 711/162
(58) Field of Classification Search .................... 714/15
   See application file for complete search history.

(56) References Cited

U.S. PATENT DOCUMENTS

| | | | | |
|---|---|---|---|---|
| 6,463,501 B1 * | 10/2002 | Kern et al. | .................. | 711/100 |
| 6,625,623 B1 * | 9/2003 | Midgley et al. | ............. | 707/204 |
| 6,678,787 B2 * | 1/2004 | Petruschka et al. | .......... | 711/112 |
| 6,898,688 B2 * | 5/2005 | Martin et al. | ................ | 711/202 |
| 7,007,044 B1 * | 2/2006 | Rafert et al. | ................. | 707/203 |
| 7,089,445 B2 * | 8/2006 | Kaiya et al. | ..................... | 714/2 |
| 7,185,227 B2 * | 2/2007 | Eguchi et al. | ................. | 714/15 |
| 2003/0135703 A1 * | 7/2003 | Martin et al. | ................ | 711/162 |
| 2003/0177308 A1 * | 9/2003 | Lewalski-Brechter | ....... | 711/114 |
| 2005/0028022 A1 * | 2/2005 | Amano | .......................... | 714/2 |
| 2005/0273650 A1 * | 12/2005 | Tsou | .............................. | 714/6 |
| 2006/0150001 A1 * | 7/2006 | Eguchi et al. | .................. | 714/6 |
| 2006/0174076 A1 * | 8/2006 | Takeda et al. | ............... | 711/162 |
| 2006/0190692 A1 * | 8/2006 | Yamagami | .................. | 711/162 |
| 2007/0028139 A1 * | 2/2007 | Wahl et al. | ..................... | 714/6 |
| 2007/0180304 A1 * | 8/2007 | Kano | ............................. | 714/6 |

* cited by examiner

*Primary Examiner*—Yolanda L Wilson

(57) ABSTRACT

A storage system including journaling comprises a controller capable of coupling to at least one storage device and to at least one journaling device, and a process executable on the controller. The executable process comprises a resolve utility capable of determining logical unit, track, and sector identification of a selected file on the at least one storage device, a user interface enabling a user to select tracks and sectors on the at least one storage device for restoration to a predetermined point in time, and a restoration utility. The restoration utility accesses data corresponding to the selected tracks and sectors from the journaling device and restores the data to the track and sector locations of the storage device to the predetermined point in time.

24 Claims, 4 Drawing Sheets

STORAGE SYSTEM WITH JOURNALING

BACKGROUND OF THE INVENTION

Modern databases use journaling, such as redo-logs, to allow reconstruction of a logical data set to a particular point in time. Users of file systems and non-Oracle applications are not similarly protected. For example, Journaled File System (JFS) Technology from IBM only has a temporary "intent" log and not a lasting redo log. A virus or worm, such as W32.Nimda.A, may destroy random critical sectors within the operating system and datasets on disk storage without regard to logical objects, for example files and transactions, that immediately invalidate operating system and data set data consistency. An attack results in a system that cannot be rebooted, cannot access a file without corrupting the file, and cannot mount or access the database.

Even a database with a redo log cannot typically repair the damage by backing out a thread of logged transactions because unauthorized sector deletes did not take place as a file/record transaction. In addition, some deletes can be inside the area represented by a file and some can be in other areas of a logical unit (LUN), such as the LUN identification (ID) area. Accordingly, a customer typically has no choice other than to either format the LUN and reload from a logical object backup or retreat to the last full and intact raw copy of the affected disk LUNs. Customers can lose as many as 900,000 of their most recent and thus valuable transactions per LUN for every hour of activity that is not replaceable by on-line or off-line backup. Thus, even the most diligent type of file system customer that replicates a mirror of a disk LUN every hour, can lose nearly a million customer transactions.

Synchronous on-line mirroring does not help, because corrupted portions are faithfully copied to the disk mirror. Journaled databases can only redo newer transactions to an old, unrestored copy of the database if the control file is manually altered, an error-prone and risky operation. Users without journaled databases are completely unprotected and can lose all transactions that occurred after the latest backup. For even the most demanding and affluent of financial services customers, no current solution to the problem is available, at any price.

SUMMARY

In various embodiments, a storage system including journaling comprises a controller capable of coupling to at least one storage device, a buffer, and at least one journaling device, and a process executable on the controller. The executable process comprises a resolve utility capable of determining logical unit, track, and sector identification for a selected file on the at least one storage device, a user interface enabling a user to select tracks and sectors on the at least one storage device for restoration to a predetermined point in time or write sequence, and a restoration utility. The restoration utility accesses data corresponding to the selected tracks and sectors from either the buffer directly for a most recent write operation, or the journaling device via the buffer for writes prior to the most recent, and restores the data to the track and sector locations of the at least one storage device.

According to other embodiments, a storage system comprises a controller, a plurality of data storage devices coupled to the controller, a directory and buffer storage device coupled to the controller, and at least one journaling storage device coupled to the controller. The storage system further comprises a process executable on the controller that responds to a write operation to one of the plurality of data storage devices by reading old data from a data storage device not written, saving the old data on the directory and buffer storage device in combination with the write operation data and a time stamp, and copying the old data to a journaling storage device of the journaling storage devices.

According to further embodiments, a method for recovering data at storage device tracks and sectors to a point in time comprises identifying logical unit, track, and sector information for a selected file on one or more storage devices, receiving restoration directions from a user, and, based on the restoration directions, selecting tracks and sectors on the at least one storage device for restoration to a predetermined point in time. The method further comprises accessing data corresponding to the selected tracks and sectors from a buffer for a most recent write, or otherwise from a journaling device, and restoring the data to the track and sector locations of the storage device to the predetermined point in time.

In still other embodiments, a method of journaling data comprises detecting a write operation directed to one of a plurality of data storage devices and, in response to the detected write operation, reading old data from a data storage device not written, saving the old data on a directory and buffer storage device in combination with the write operation data and a time stamp, and copying the old data to a journaling storage device.

BRIEF DESCRIPTION OF THE DRAWINGS

Embodiments of the invention relating to both structure and method of operation, may best be understood by referring to the following description and accompanying drawings.

DETAILED DESCRIPTION

What is desired is a two-stage journaling capability that can save data and thus the associated money that result from lost transactions and defecting customers.

Figure 1:
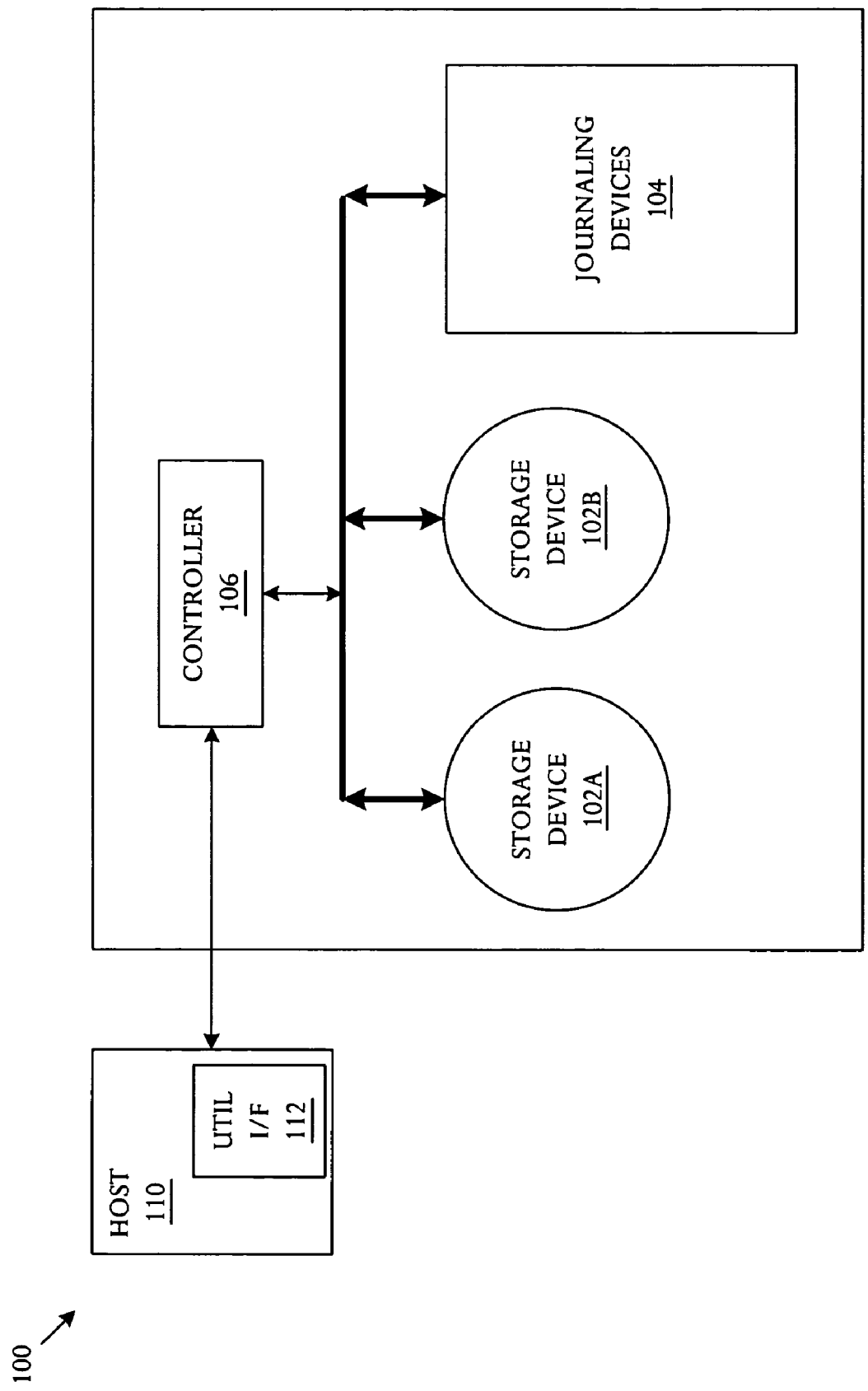
FIG. 1 is a schematic block diagram that illustrates an embodiment of a storage system that includes a journaling capability.

Referring to FIG. 1, a schematic block diagram depicts a storage system 100 that includes a two-stage journaling capability. The storage system 100 includes a plurality of storage devices 102A and 102B, which represent a single device in a Redundant Array of Inexpensive Disks (RAID-1) configuration, one or more journaling devices 104, and a controller 106. The controller 106 is capable of executing various processes, procedures, and methods. The storage system 100 also includes a host 110 that can communicate with the controller 106 and storage components. The host 110 utilizes computer, processor, or controller elements to execute various utilities and interfaces 112 to facilitate management of the storage system 100. In an illustrative embodiment, the executable processes variously configured for operation in the host 110 and/or the controller 106 include a resolve utility that determines the logical unit, track, and sector identifications for a selected file on the one or more storage devices 102A and 102B. The storage devices 102A, 102B generally include a buffering capability for temporarily storing information. A user interface enables a user to select tracks and sectors on the one or more storage devices 102A and 102B for restoration to a predetermined point in time or write sequence. A restoration utility is included that accesses data corresponding to the selected tracks and sectors from either a buffer associated with the storage devices 102A, 102B for most recent writes, or from the journaling device 104 via the buffer for writes prior to the most recent, and restores the data to the track and sector locations of the storage device 102A and 102B to the predetermined point in time.

The user interface can be selected from among various forms including a Meta-command interface, a Command Line Interface (CLI) and a Graphical User Interface (GUI). The user interface enables individual and collective selection of tracks and sectors for restoration, and selection of the point in time.

The user interface generally executes on the host computer 110 or other computers or processors capable of communicating with the storage system 100. If the user interface utilizes and operates upon information relating to storage devices or logical units (LUs), rather than individual files, a computer such as a personal computer that controls the storage arrays can be used. Alternatively, a user interface that utilizes and operates at the file level more appropriately executes on a host computer 110 that can detect and identify the files.

A suitable user interface can take one or more of several forms. A user interface has increased utility in a form that enables a sophisticated Administrator user, for example with Super User privileges, to conveniently request restore operations via track, sector, and length triplet requests identified explicitly or implicitly by file name. Super User privileges grant a special directory administrator full access to directory information. In various embodiments, the user interface enables access to a single triplet or triplets in a specified range. In a specific example, a resolve utility may be used to supply current track/sector/length triplet information for a file 'foo'. The user can use the specified triplets to request an entire file area to be restored. In one example, the user can request a file area based on time, for example 10:51 AM today. In another example, the user can request a particular write sequence number. Specifically, when the time of a virus attack is not known, the user can request cancellation of the last write operation to trk0/sector0 which was generated by the virus. In a further example, the user can operate upon specific parts of a file that are known to be affected by an erroneous write operation. In an implicit case, a user can request that a file be restored in entirety as of a selected time, so long as the file is completely contained within journaled areas. Storage system operation enables a wide range of other usages.

Sophistication of the directory structure dictates the effort and time of a particular restore operation. Generally the necessity for a restore operation is rare and limited to circumstances of highly valuable lost data so that any delay associated with the restore operation is tolerable.

Figure 2:
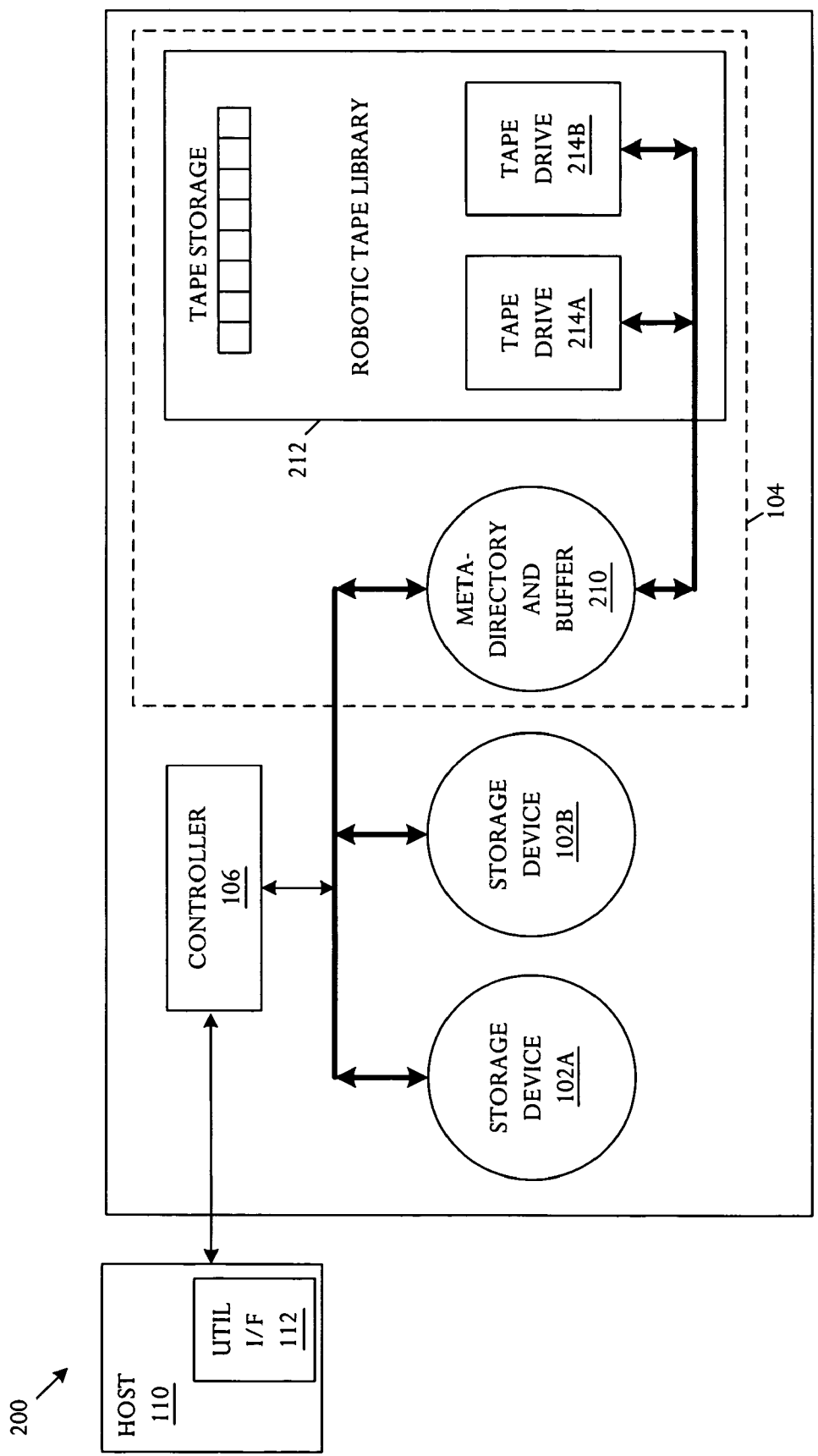
FIG. 2 is a schematic block diagram showing an alternative embodiment of a storage system with tape journaling capability.

Referring to FIG. 2, a schematic block diagram shows an alternative embodiment of a storage system 200 with tape journaling capability. The storage system 200 comprises a controller 106, storage devices 102A and 102B, a directory and buffer storage device 210, and one or more, although typically multiple, journaling storage devices 214A and 214B. In the illustrative embodiment, the controller 106 is a disk controller that controls disks in a Redundant Array of Inexpensive Disks (RAID-1) configuration. The storage devices 102A and 102B are two data disks or logical device disk portions of the disks representing a single logical volume in RAID-1 configuration. The directory and buffer storage device 210 is a meta-file directory, and buffer disk or logical device disk portion. The illustrative one or more journaling storage devices 214A and 214B are a pair of journaling tape drives in a local or remote tape library 212.

For a write operation, the meta-directory and buffer storage device 210 temporarily stores the new data, a time stamp associated with the new data, and a pointer to old data on the journaling storage device 214A, 214B. The storage system thus enables restoration of the latest write, for example in case of a primary disk failure, in addition to older writes, for example in response to an erroneous write. Restoration can be made either directly from the meta-directory and buffer storage device 210 for the most recent or current write, or from the journaling storage devices 214A, 214B, as directed by the locating capabilities of the meta-directory and buffer storage device 210 for older writes. Accordingly, the journaling process or method includes two stages for handling recent data and older data. Prudent data management practices provide for periodic backup of the meta-directory and buffer storage device 210 to eliminate or reduce downtime.

The storage systems 100 and 200 perform journaling operations to facilitate recovery of storage array LUN tracks and sectors to a particular condition, circumstance, or point in time. The storage system 200 in the illustrative example supplements a standard RAID-1 with components that add a journaling capability. The standard RAID-1 system includes a disk controller and two data disks. The illustrative enhanced storage systems 100 and 200 add journaling device 104 and executable processes, procedures, methods, utilities, and user interfaces that exploit and handle the journaling device 104. The journaling device 104 includes a meta-directory and buffer 210 illustrative implemented as storage device, disk, logical device (LDEV), or storage device portion, such as a disk portion.

Processes and methods, typically executable on the controller 106, operate to respond to a write operation to one of the first 102A and second 102B data disks by reading old data from the disk that is not written and saving the old data on the meta-file directory and buffer disk 210 in combination with the write operation data. The process copies the old data to a tape drive of the first 214A and second 214B journaling tape drives, while retaining the new data in the meta-directory along with a time stamp. The process can access the storage devices 102A and 102B with the granularity of a per-disk-driver-write that designates only logical unit number (LUN), track, sector, and length, to the particular RAID-1 spindle that is written, reads old data from the other spindle for transfer to the directory and buffer device 210 and consequently to the tape drives 214A and 214B.

The old data is copied, for example electronically copied, to the tape library 212. In a particular example, old data can be copied by third party Small Computer Systems Interface (SCSI) copy over a Fibre Channel optical link to a high-speed tape library 212 directly linked to the disk array storage system 100. In other examples, configurations, interfaces, and communication linkages of any appropriate type may be used. The electronic copy can be controlled by the disk array controller 106.

In accordance with another process that is executable on the storage system 200, as a current first tape fills, writing to the tape drives 214A and 214B can be switched to a second alternate drive and media tape in the tape library 212. The previous or first tape can be exchanged and replaced by robotic drives in the tape library 212. The meta-directory in the directory and buffer device 210 tracks tape writes, for example every tape write, by tape number, tape record number, date, time, and tracks and sectors written. In a particular example, a 16-tape drive robotic library 212 can protect eight disk array LUNs.

The disk controller 106 performs standard functions and features of contemporary disk array internal controllers and supplements the standard operations with additional new operations that enable journaling capabilities. In some embodiments, during the write of new data onto either, typically the least busy, RAID-1 disk, the controller 106 copies the old data to the buffer disk 210, in combination with a generated sequence number and identification of the time and day. The controller 106 generates and stores a note of the journaling operation in the permanent directory of the buffer disk 210 which is periodically backed up according to traditional zero-downtime disk backup practices.

In another operation, the disk controller 106 writes the journaled data from the 'end' of the journaled spool to a currently active tape drive 214A or 214B at a data size and rate appropriate for streaming tape drives. When a tape media element is filled, the controller 106 switches writing to the alternate tape drive, and signals the tape library 212 to store the filled tape media and replace the filled tape with another tape, such as an empty or scratch tape.

In a further operation, the disk controller 106 can maintain a permanent directory on the buffer disk 210 that, when requested to restore data prior to the most recent write, identifies the location and enables reading of the correct tape numbers and record numbers within the tapes to facilitate data restoration. When the most recent write is to be restored, the corresponding write data is supplied directly from the buffer disk 210.

In a illustrative embodiment, the directory and buffer device 210 is an available disk, portion of disk, logical device (LDEV) or the like, that is designated for journaling usage to contain directory and buffered data write activity, in combination with appropriate header and trailer information, or other useful information to assist journaling or identify the journaled data. Generally, a larger directory and buffer device 210 may be desirable to facilitate usage as a staging buffer and enable efficient writing of data to the journaling drives 214A and 214B, enabling the tapes to operate at increased efficiency and throughput.

In an illustrative embodiment, the storage devices 102A and 102B can be standard disk drives arranged in a standard RAID-1 configuration. Operations of storage system 100 or 200 and the controller 106 add to the functionality of the disks to enable the described data journaling capabilities and enhancements. In the journaling storage system 100 or 200, during a write operation to one disk, typically the least busy disk, old data is read from the other disk by the internal disk controller 106 and moved to the buffer disk 210 before the same data is written to both disks 102A and 102B. Other suitable storage devices may include other types of disk drives, or drives using other magnetic storage technologies, such as magnetic tape drives. In other embodiments, additional storage devices may be added and supported by the journaling storage system 100 or 200.

In various embodiments, the tape library 212 and tape drives 214A and 214B are standard industry tape drives. In a particular example, the tape drives can be Ultrium™ tape drives, manufactured and sold by Hewlett-Packard Company of Palo Alto, Calif., that can accept writes at 15 MB/s (megabytes per second) native with a single tape holding 100 MB. With 2:1 compression, a common access speed is 24 MB/s and a common capacity is 200 MB per tape. Many other tape drives and tape media can otherwise be used. Common currently-available libraries include 2-16 tape drives and from tens to thousands of tape storage slots. A tape library dedicated to a journaling application, as described herein, typically can have a multiple of two tape drives with each pair of drives capable of journaling one raw disk RAID-1 disk pair, or one disk portion.

In various embodiments, the library capacity can be configured according to the amount of disk space to be journaled, for example whether a journal writes against one or 1000 tracks, and the projected write activity, for example a rate of 25 or 250 writes per second. Considerations also include the policies of the administrator for removing tapes from the library to another location, and the possible remoteness of the location. Considerations also may include the desired archiving duration, how far back in time a restore may be made, for example X writes ago or X minutes ago.

Due to considerations of distance, the data path to the tape drives is generally desired to be optical, for example native Fibre Channel (FC) or via FC-to-SCSI converter. Depending on the sophistication of the tape library, tape change requests may pass in-band through the data path or out-of-band via another route, such as 100 bT Local Area Network (LAN) connection. Requests for a tape that has been stored in a vault off-site generally are made to prompt the library 212 to post a request for human assistance.

A single RAID-1 system can support one or many logical units (LUNs) and one or many files. Accordingly, a user can be given the option to perform raw LUN journaling either on the entire disk or on selected track and sector address ranges contained within the disk. The resolve utility can be used to report the address ranges used by either a file or raw LUN. Various resolve utilities are known to those having ordinary skill in the art. The smaller the disk area to be journaled, the less often journaled data tapes need to be changed.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 3:
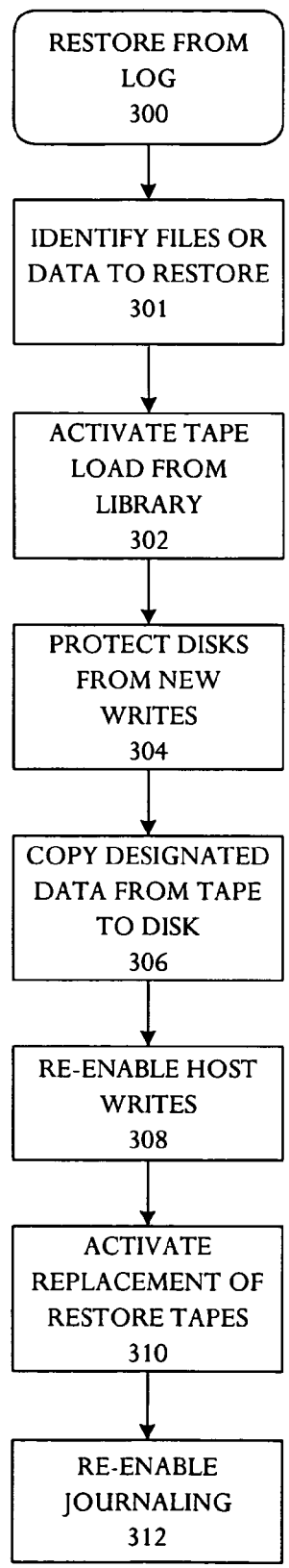
FIG. 3 is a flow chart that depicts control operations, for example executed by a controller, to restore data from the time indexed log.

Referring to FIG. 3 in combination with FIG. 2, a flow chart depicts an example of a method for recovering data at storage device tracks and sectors to a point in time 300. The method or process 300 can be executed by a processor or controller such as the disk controller and includes identifying logical unit, track, and sector information 301 for a selected file on one or more storage devices. Upon receiving restoration directions from a user, and, based on the restoration directions, selecting tracks and sectors on the at least one storage device for restoration to a predetermined point in time. The method further comprises accessing data corresponding to the selected tracks and sectors from a buffer disk or tape journaling device, and restoring the data to the track and sector locations of the storage device to the predetermined point in time In response to a restore-from-log situation, the internal disk controller 106 signals the tape library 212 to cause the correct tape or tapes to be loaded 302 by the library 212. In some conditions, signals may activate library robotics to automatically load the tape(s). In other conditions, a signal may be sent to an administrator to enable recovery of the correct tape media from a remote storage or vault and replaced into the library 212. The controller 106 protects against new host writes 304 to the storage devices 102A and 102B, for example RAID-1 disks. The controller 106 copies customer-designated data 306 from the tapes 214A and/or 214B to the RAID-1 disks 102A and 102B at the original position of the data on the disks. The controller 106 re-enables host writes 308 after data restoration.

When the restore operation is complete, the controller 106 sends signals to cause the restore tapes to be returned or reshelved 310 within the tape library 212. The controller 106 re-enables data journaling 312 with appropriate tapes loaded.

Figure 4:
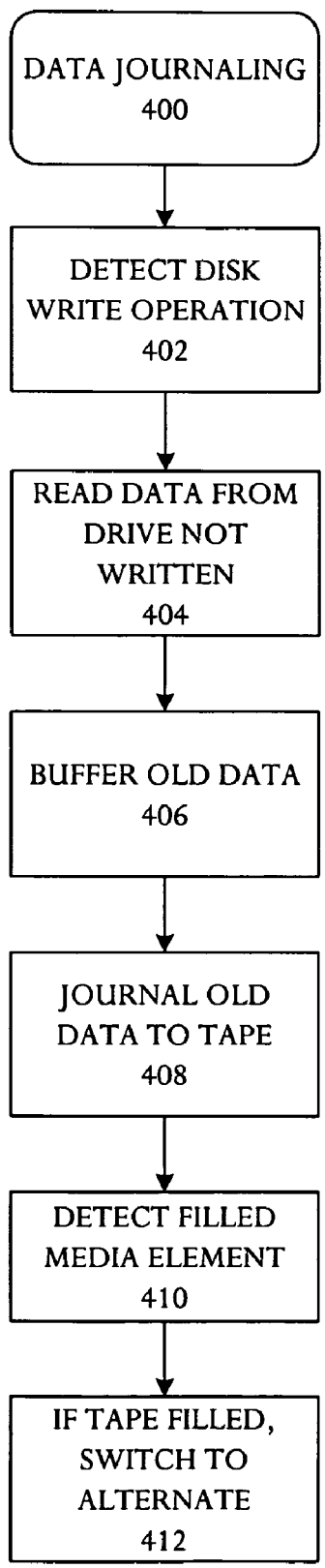
FIG. 4 is a flow chart that illustrates an example of a method of journaling data.

Referring to FIG. 4 in combination with FIG. 2, a flow chart illustrates an example of a method of journaling data 400. The method or process can be executed by the controller 106 and includes detecting a write operation 402 directed to one of the of data storage devices 102A or 102B and, in response to the detected write operation, reading old data from a data storage device that is not written 404. The controller 106 saves the old data 406 on a directory and buffer storage device 210 in combination with the write operation data. The old data is copied 408 to the journaling drives 214A and 214B in the journaling storage device 104. The most current write is retained in the meta-directory.

In some embodiments, the process can also include detecting the filling of a media element 410, for example a tape, in a tape drive 214A or 214B, as data is written to the drive. If the media element is filled, the process can include switching to the alternate tape drive or to an alternate tape 412 and identifying the written media by media element number, record number, date, time, and track and sector identification.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although the disclosed apparatus and technique is described with reference to a RAID-1 configuration, other arrangements may use other appropriate configurations and standards. The disclosed system describes storage elements and controllers of particular types, other appropriate storage and controller technologies may be used. The particular number of elements, for example two disk drives or LDEVs and two tape drives, express a simple configuration to most clearly describe the operations performed. Other suitable embodiments can be made that add to the number of components participating in the storage operations.

What is claimed is:

1. A storage system comprising:
   a controller;
   a plurality of data storage devices coupled to the controller;
   a directory and buffer storage device coupled to the controller;
   at least one journaling storage device coupled to the controller, and
   the controller operative to respond to a write operation to one of the plurality of data storage devices by reading old data from a data storage device not written, saving the old data on the directory and buffer storage device in combination with the write operation data and a time stamp, and copying the old data to a journaling storage device of the at least one journaling storage devices.

2. The storage system according to claim 1 further comprising:
   the controller operative, as a media element fills one of the at least one journaling storage devices, to switch to an alternate journaling storage device; and
   the controller operative to identify individual written media elements by media element number, record number, date, time, and written storage device tracks and sectors.

3. The storage system according to claim 1 wherein:
   the controller is a disk controller;
   the plurality of data storage devices are logical devices;
   the directory and buffer storage device is a meta-file directory, and buffer logical device; and
   the at least one journaling storage device are a pair of journaling tape drives in a local or remote tape library.

4. The storage system according to claim 1 wherein:
   the controller is a disk controller that controls disks in a Redundant Array of Inexpensive Disks (RAID-1) configuration;
   the plurality of data storage devices comprises two data disks or logical device disk portions;
   the directory and buffer storage device is a meta-file directory, and buffer disk or logical device disk portion; and
   the at least one journaling storage device are a pair of journaling tape drives in a local or remote tape library.

5. The storage system according to claim 1 further comprising:
   the controller operative to detect a write operation to a data storage device of the plurality of data storage devices and respond by reading old data from an alternate data storage device of the plurality of data storage devices, and log the old data to the directory and buffer storage device.

6. The storage system according to claim 5 further comprising:
   the controller operative to respond to a restore-from-log condition by requesting loading of appropriate media from the at least one journaling storage device, deferring new write operations directed to the plurality of data storage devices, copying designated data from the at least one journaling storage device to the data storage devices at the location prior to logging, and re-enabling write operations.

7. The storage system according to claim 6 further comprising:
the controller operative following completion of the restore-from-log operation to request re-shelving of restore media within the at least one journaling storage device, and re-enable journaling with appropriate journaling media loaded.

8. The storage system according to claim 1 further comprising:
a host connection to the controller;
a host coupled to the controller via the host connection; and
a user interface operative in the host that enables a user to selectively perform journaling on an entire storage device and on selected track and sector address ranges contained within a storage device.

9. The storage system according to claim 1 further comprising:
the controller operative, during a write operation of new data onto a data storage device of the plurality of data storage devices, to copy old data from the location of the new data write in combination with a generated sequence number and an identifier of the current date and time, and enter a journaling notation in a permanent directory on the directory and buffer storage device.

10. The storage system according to claim 1 further comprising:
the controller operative to write journaled data from the end of a first journaling storage device to a currently active second journaling storage device at a data rate appropriate for streaming data; and
when media for the currently active second journaling storage device is filled, switch writing to an alternate journaling storage device and signal the at least one journaling storage device to store and replace the filled media.

11. The storage system according to claim 1 further comprising:
the controller operative to maintain a permanent directory on the directory and buffer storage device and, upon request to restore data, enable the location and reading of designated media identifiers and record numbers.

12. A method for recovering data at storage device tracks and sectors to a point in time comprising:
identifying logical unit, track, and sector information for a selected file on the at least one storage device;
receiving restoration directions from a user;
based on the restoration directions, selecting tracks and sectors on the at least one storage device for restoration to a predetermined point in time;
accessing data corresponding to the selected tracks and sectors from a buffer for a most recent write, or otherwise from a journaling device; restoring the data to the track and sector locations of the at least one storage device to the predetermined point in time; and
journaling data on a journaling storage device comprising:
detecting a write operation to one of first and second data storage devices; and
in response to the detected write operation, reading old data from the data storage device not written, buffering the old data in combination with the write operation data, and copying the old data to the journaling storage device.

13. The method according to claim 12 further comprising:
as a media element fills in the journaling storage device, switching to an alternate journaling storage device; and identifying individual written media elements by media element number, record number, date, time, and written tracks and sectors.

14. The method according to claim 12 further comprising:
recording journaling operations on a per storage device write granularity which designates a write operation on the basis of logical unit, track, sector, and length.

15. A method of journaling data comprising:
detecting a write operation directed to one of a plurality of data storage devices;
in response to the detected write operation:
reading old data from a data storage device not written;
saving the old data on a directory and buffer storage device in combination with the write operation data and a time stamp; and
copying the old data to a journaling storage device.

16. The method according to claim 15 further comprising:
as data is written to the journaling storage device, detecting filling of a media element in the journaling storage device;
in response to detection of the filled media element, switching to an alternate journaling storage device of a plurality of journaling storage devices; and
identifying individual written media by media element number, record number, date, time, and written storage device tracks and sectors.

17. The method according to claim 15 further comprising:
detecting a write operation to a data storage device of the plurality of data storage devices; and
for a write to the data storage device:
reading old data from an alternate data storage device of the plurality of data storage devices; and
logging the old data to the directory and buffer storage device.

18. The method according to claim 17 further comprising:
detecting a restore-from-log condition;
in response to the detected restore-from-log condition:
requesting loading of appropriate media from the at least one journaling storage device;
deferring new write operations directed to the plurality of data storage devices;
copying designated data from the at least one journaling storage device to the data storage devices at the location prior to logging; and
re-enabling write operations.

19. The method according to claim 18 further comprising:
determining completion of the restore-from-log operation; and
responding to completion comprising:
requesting re-shelving of restore media within the at least one journaling storage device; and
re-enabling journaling with appropriate journaling media loaded.

20. The method according to claim 15 further comprising:
detecting a write operation of new data onto a data storage device of the plurality of data storage devices; and
responding to the new data write comprising:
copying old data from the location of the new data write in combination with a generated sequence number and an identifier of the current date and time; and
entering a journaling notation in a permanent directory on the directory and buffer storage device.

21. The method according to claim 15 further comprising:
writing journaled data from the end of a first journaling storage device to a currently active second journaling storage device at a data rate appropriate for streaming data; and when media for the currently active second journaling storage device is filled:
   switching writing to an alternate journaling storage device; and
   signaling the at least one journaling storage device to store and replace the filled media.

22. The method according to claim 15 further comprising:
maintaining a permanent directory on the directory and buffer storage device; and
upon request to restore data, enabling the location and reading of designated media identifiers and record numbers.

23. An article of manufacture comprising: a computer-readable medium having a computer readable program code embodied therein for recovering data at storage device tracks and sectors to a point in time, the computer readable program code further comprising: a code causing the computer to identify logical unit, track, and sector information for a selected file on the at least one storage device; a code causing the computer to receive restoration directions from a user; a code causing the computer to select tracks and sectors on the at least one storage device for restoration to a predetermined point in time, based on the restoration directions; a code causing the computer to access data corresponding to the selected tracks and sectors from a journaling device; and a code causing the computer to restore the data to the track and sector locations of the at least one storage device to the predetermined point in time; a code causing journaling data on a journaling storage device comprising: code causing detecting a write operation to one of first and second data storage devices; and code causing in response to the detected write operation, reading old data from the data storage device not written, buffering the old data in combination with the write operation data, and copying the old data to the journaling storage device.

24. A storage system comprising:
   multiple means for storing data;
   means for storing directory information coupled to the multiple data storing means;
   means for temporarily storing data coupled to the directory information storing means;
   means for journaling data coupled to the data storing means; and
   means responsive to a write operation to the multiple data storing means further comprising:
      means for reading old data from a data storing means not written;
      means for saving the old data temporary data storing means in combination with the write operation data; and
      means for copying the old data to data journaling means.

* * * * *